Patented Jan. 30, 1923.

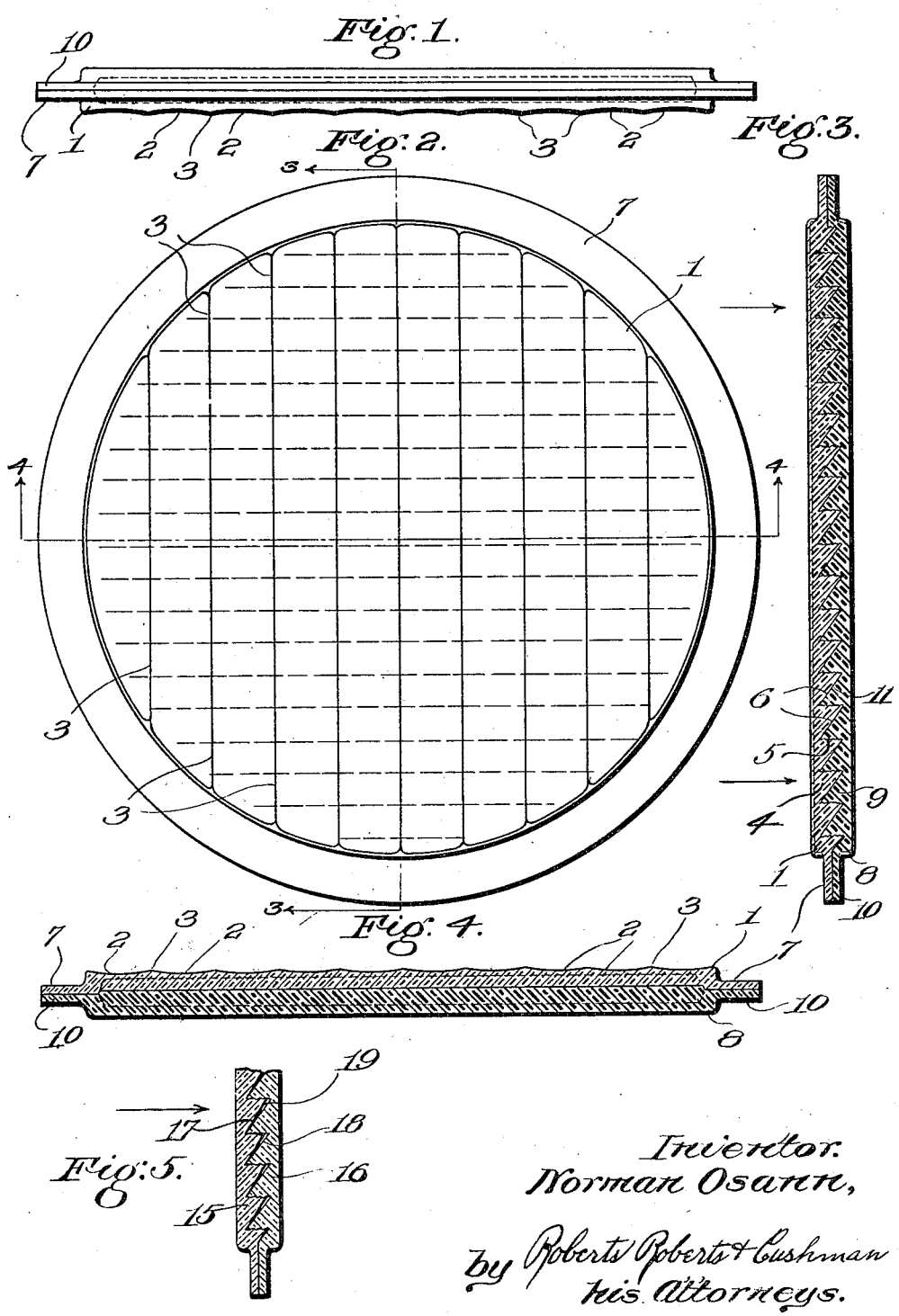

1,443,756

UNITED STATES PATENT OFFICE.

NORMAN OSANN, OF ARLINGTON, MASSACHUSETTS, ASSIGNOR TO KALMUS, COMSTOCK & WESCOTT, INC., OF BOSTON, MASSACHUSETTS, A CORPORATION OF MASSACHUSETTS.

OPTICAL REFRACTING DEVICE.

Application filed February 9, 1920. Serial No. 357,280.

*To all whom it may concern:*

Be it known that I, NORMAN OSANN, a citizen of the United States of America, and resident of Arlington, in the county of Middlesex and State of Massachusetts, have invented new and useful Improvements in Optical Refracting Devices, of which the following is a specification.

This invention relates to improvements in optical refracting devices and more particularly to translucent screens for headlights, searchlights, floodlights, or the like.

This invention is particularly adapted for use in connection with headlights for automobiles and provides means whereby light rays directed more than a predetermined angle above the horizontal may be intercepted without substantially distorting or changing the general direction of the rays directed below the predetermined angle.

Devices of this character are essential for use with automobiles in order to limit the light of the headlights so that pedestrians or other motorists will not be blinded by the upward rays, and yet this should be done without interference with the horizontal and downward rays which are necessary to illuminate the road.

This invention is covered broadly by the pending application of Daniel F. Comstock, Serial No. 92,750, filed April 21, 1916 and application of the same inventor Serial No. 357,267 filed on even date herewith. Therefore, I do not claim broadly the use of a selective screen of critical angle reflecting prisms as my invention, but only certain improved forms and structures of such screens as will appear more clearly as the description proceeds.

A critical angle reflector is formed by the use of prisms whose oblique surfaces act to reflect all rays which impinge upon those surfaces at an angle greater than the critical reflecting angle of the prisms, which critical angle depends upon the refractive index of the material forming the prisms.

The light striking the reflecting surface or surfaces at a lesser angle than the critical angle passes through but is bent up due to the refraction of the prism. Since it is desired to have this light which passes through continue in substantially its former direction, it is desirable to place in its path a second set of prisms to return it to that path by counter refraction.

One of the main features of the present invention is to so form the secondary prisms as to cause the counter refraction to be greater than the original refraction. By the use of such secondary refraction the reflecting surfaces of the critical angle reflecting prisms may be so disposed as not to totally reflect rays unless they impinge thereon at more than a predetermined angle above the horizontal, this angle being substantially equal to the angle which represents the difference between the first refraction and the counter refraction.

To illustrate, if the reflecting prisms are so formed as to transmit and turn upwardly by refraction twenty degrees the light impinging thereon directed up to 2° above the horizontal, and the counter refracting prisms turn the transmitted light downward twenty-two degrees, all directly transmitted rays when they leave the secondary prisms will be directed horizontally or below the horizontal.

It should be very clearly understood that the action of the screen is uniform throughout its whole surface. This means that any light reaching any portion of the screen from top to bottom which is traveling in a direction above the predetermined angle will be stopped while other rays will pass through.

One object of the invention is to provide improved means for changing the course of light rays, to eliminate external or exposed prismatic faces for this purpose, and to encompass the refracting surfaces within the screen or other optical device.

Another object of the invention is to provide a translucent screen of the type adapted to transmit and intercept respectively different rays, as e. g. non-glaring and glaring rays in the case of headlights, which is also adapted to change the course of the transmitted rays. Still another object is to control the lateral distribution of the light conjunctively with the elimination of glare or the change in course or both.

In one aspect the invention comprises a translucent screen for headlights and the like having internal refractive surfaces adapted to change the course of the light, so that the light emerges from the screen in a direction different from that in which it enters. The internal refracting means preferably functions independently of the entrant and emergent faces of the screen so that the outside faces of the screen may if desired be made perfectly smooth and parallel, but supplementary refracting surfaces or prisms may be provided on one or both of the entrant and emergent faces.

The internal refracting means preferably comprises two distinct components of different refractive powers so that the light is turned different degrees by the respective components, and preferably in different directions. While the difference in refractive power may be provided in various ways, in this application two preferred means to the end have been shown, one of which involves the use of different refractive indices in the respective components of the lens, and the other of which involves the use of prisms having their oblique faces at different angles.

In another aspect the invention involves a translucent screen of the type adapted to transmit and intercept different rays respectively, as e. g. rays differing in direction of propagation, the screen being characterized by interior means to change the direction of the transmitted rays, the interior means preferably comprising contrarelated refracting components to bend the transmitted rays successively different degrees in different directions. The aforesaid refracting surfaces may be supplemented by outside distributing surfaces, the division of the screen into component parts affording at least four surfaces instead of the usual two upon which to form light controlling prisms or other surfaces.

Other and further objects and results of my improved screen will appear as the disclosure proceeds.

One embodiment of my invention in a preferred form is shown in the accompanying drawings in which—

Fig. 1 is a top plan view of my improved screen;

Fig. 2 is a view looking from the location of the source of light;

Fig. 3 is a vertical cross-section on the line 3—3 of Fig. 2 looking in the direction of the arrows on that line;

Fig. 4 is a horizontal cross-section on the line 4—4 of Fig. 2 looking in the direction of the arrows on that line; and Fig. 5 is a cross-section similar to Fig. 3, but of a modified form and partly broken away.

In Figures 1 to 4 of the drawings, 1 designates a plate of glass formed on one side with a series of vertically extending concave surfaces 2, these surfaces meeting on lines 3. The opposite side of the plate carries horizontally disposed prisms 4, best seen in Fig. 3. These prisms have substantially horizontal upper surfaces 5.

The oblique faces 6 of the prisms are placed at an angle to the axis of the beam of light such that they will act as critical angle reflecting surfaces for all rays directed more than a predetermined angle above the horizontal, this angle depending upon the index of refraction of the glass of the plate.

Interfitting with the plate 1 is a second plate of glass 8 which is denser than the plate 1 and consequently has a higher refractive index. This plate has on one face prisms 9, which are the reverse in shape of the prisms 4 and the other face, as shown, is plane.

Both plates 1 and 2 have reduced portions 7 and 10 respectively around their edges in order to be fitted into a suitable frame or holder or into the usual headlight casing (not shown).

The present type of screen, which is uniform throughout its surface in so far as its reflective action is concerned, serves to reflect all rays directed upwardly more than a predetermined angle whether coming from the reflector or light source.

These upwardly reflected rays are directed by the reflecting surfaces 6, against the surfaces 5 which may be made to absorb, diffuse, reflect or otherwise obstruct the light incident thereto by painting, roughening, silvering or otherwise treating the surfaces. For example, the surfaces may be sanded to somewhat diffuse the light which will then be reflected forward by the reflective surfaces 11 of the prisms 9 on the face plate 8; or the surfaces may be silvered so as to reflect the rays downwardly at a comparatively acute angle to illuminate the ground directly in front of the headlight.

The form of the device shown in Figure 5, comprises two sheets of glass 15 and 16 having on their meeting faces the prisms 17 and 18 respectively. The prisms 17 are formed to act as critical angle reflectors, the light coming from the left as indicated by the arrow. The shape of the interfitting prisms 18 is such that there remains between the prisms the wedge-shaped spaces 19. These spaces may simply remain filled with air or they may be filled with any gaseous, liquid or solid material which transmits light. These spaces serve as a third set of refracting prisms.

If these spaces are filled with material of less refractive index than the plate 15, the critical reflection will take place at the entrance to the space and the rays will be bent down more in passing out of the space than they were bent up in entering the space.

If these spaces are filled with material of greater refractive index than the plate 15, the critical reflection will take place at the far side of the space and the rays will be bent down more in passing into the space than they will be bent up in passing out of the space.

If these spaces are simply filled with air the result of this construction will be to accomplish the same result as that accomplished by the form shown in Figures 1 to 4 inclusive.

In the preceding description it has been assumed that the axis of the parabolic reflector has been placed horizontally and the screen vertically with the light coming to the lens in the direction indicated by arrows in Figs. 3 and 5, this being the normal use of the device in connection with automobile headlights. However, the device may be adapted to various headlights and operating conditions by varying the reflecting surfaces, the relative refractive indices of the component parts, etc. For example, I have found that due to sagging of the incandescent filament the light beam frequently becomes inclined upwardly above its normal direction after a time; by making the reflecting surfaces more nearly vertical and by increasing the effective difference between the refractive action of the two parts of the device the beam may be transmitted and bent down sufficiently to maintain the desired intensity in the desired direction.

The concave surfaces which are shown on the face toward the light source may equally well be placed on the outer face of the screen and act to cause a certain amount of lateral spread of the light. The vertical light bands from the several individual surfaces overlap and commingle to avoid any dark spots in the light and also extend the light laterally so as to illuminate objects at either side of the main beam. This lateral light is, however, also acted upon by the reflecting prisms and does not extend above the predetermined plane.

While I have described this new form of screen in connection with an automobile headlight it is obvious that it is much wider in its application. It will be of utility in connection with various schemes of floodlighting of buildings, advertisements, etc. In such uses its function would be to serve to deliver a stream of light with one sharply defined boundary. In varying uses the screen might be rotated through ninety degrees to limit the light so as not to pass beyond the side of a building or sign, or rotated one hundred and eighty degrees so as not to pass below a given line. Such a screen would also be useful turned as it is in a headlight when used in connection with flood-light projectors on street crossings as is now a common custom. In this case the traffic officers would not be blinded by the light.

A secondary characteristic of critical-angle reflectors which has been ignored herein for the sake of clearness and brevity is the following. While most of the rays striking the critical-angle reflecting surface at angles less than the critical-angle, i. e. at angles more abrupt than the critical-angle, are transmitted, a certain proportion of such rays are reflected, the proportion being larger immediately within the critical angle but rapidly decreasing to a minimum of about four per cent at the perpendicular. With the screens herein disclosed this reflected portion of the rays incident within the critical angle is treated in the same manner as the reflected rays incident at angles greater than the critical angle.

I claim:—

1. A translucent screen for headlights comprising a plurality of prismatic elements arranged in succession in the path of the light, the elements having transverse prisms with opposed surfaces inclined to the vertical thereby to refract the light vertically, and the indices of refraction of the successive elements being different, whereby the vertical refraction produced by the successive prisms is different.

2. A transparent screen for headlights comprising juxtaposed plates of glass having transverse prisms on their adjacent faces, the indices of refraction of the plates being different.

3. A transparent screen for headlights comprising juxtaposed plates of glass having interfitting transverse prisms on their adjacent faces, the refractive index of the downwardly refracting prisms being greater than that of the upwardly refracting prisms.

4. A transparent screen for headlights comprising juxtaposed plates of glass having interfitting transverse prisms on their adjacent faces, the vertical slope of the prisms being substantially equal, and the refractive index of the downwardly refracting prims being greater than that of the upwardly refracting prisms.

5. A translucent screen for use with light projecting apparatus comprising a critical angle reflector in combination with a prismatic member adapted to refract at its entrant surface the rays which pass through the critical angle reflector, said prismatic member having a greater index of refraction than the critical angle reflector.

6. A translucent screen for use with light projecting apparatus comprising a critical angle reflector in combination with a prismatic member adapted to refract the rays which pass through the critical angle reflector, said prismatic member having a different index of refraction than the critical angle reflector.

Signed by me at Boston, Massachusetts, this 31st day of January, 1920.

NORMAN OSANN.